United States Patent [19]

Vogel et al.

[11] Patent Number: 4,834,209

[45] Date of Patent: May 30, 1989

[54] TRANSVERSE WAVE LOGGER

[75] Inventors: Charles B. Vogel; Mike Davis; James O. Guy, all of Houston; John R. E. Smith, Richmond, all of Tex.

[73] Assignee: Western Atlas International, Inc., Houston, Tex.

[21] Appl. No.: 104,794

[22] Filed: Oct. 5, 1987

[51] Int. Cl.⁴ .................................................. G01V 1/40
[52] U.S. Cl. ...................................... 181/105; 181/106; 367/32
[58] Field of Search ........................ 367/25, 32, 33, 35; 181/102, 104, 105, 106

[56] References Cited

U.S. PATENT DOCUMENTS

| | | | |
|---|---|---|---|
| 3,276,533 | 10/1966 | Pickett et al. | 181/0.5 |
| 3,330,375 | 7/1967 | White | 181/0.5 |
| 3,333,238 | 7/1967 | Caldwell | 340/18 |
| 3,340,953 | 9/1967 | Zemanek, Jr. | 367/28 |
| 3,376,950 | 4/1968 | Grine | 181/0.5 |
| 4,131,875 | 12/1978 | Ingram | 340/15.5 |
| 4,493,062 | 11/1985 | Mallett | 367/32 |
| 4,516,228 | 5/1985 | Zemanek, Jr. | 367/75 |
| 4,580,252 | 4/1986 | Mallett | 181/104 |
| 4,649,526 | 3/1987 | Winbow et al. | 367/35 |
| 4,709,357 | 11/1987 | Maki, Jr. | 367/35 |

OTHER PUBLICATIONS

"Cement Bond Log-A Study of Cement & Casing Variables", Pardue et al., Journal of Petroleum Tech., 5/63.

Primary Examiner—Thomas H. Tarcza
Assistant Examiner—Ian J. Lobo
Attorney, Agent, or Firm—William A. Knox

[57] ABSTRACT

A transverse-wave logging tool consists of a plurality of sets of transducers mounted around a cylindrical mandrel. The transducer active faces are characterized by two orthogonal dimensions, one of which dimensions is a half-wavelength long relative to the acoustic excitation energy applied to a transmitter transducer and the transverse-wave formation velocity. Receiver transducers detect converted-compressional waves resulting from transverse waves that were generated by the acoustic excitation energy.

11 Claims, 4 Drawing Sheets

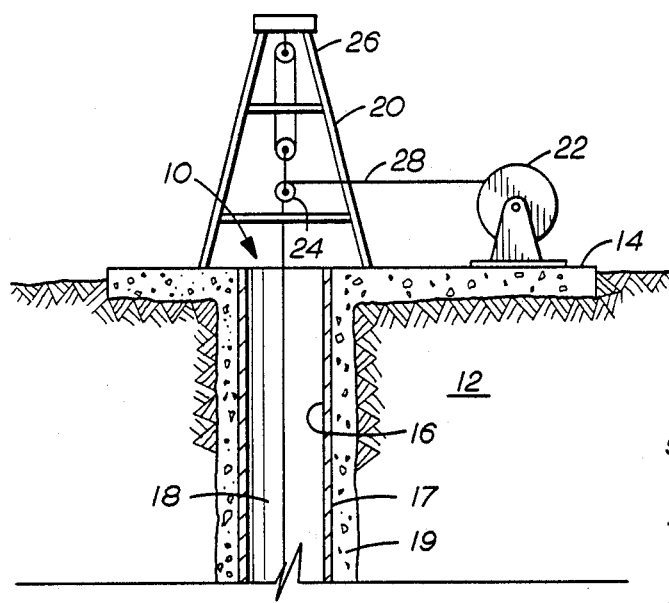
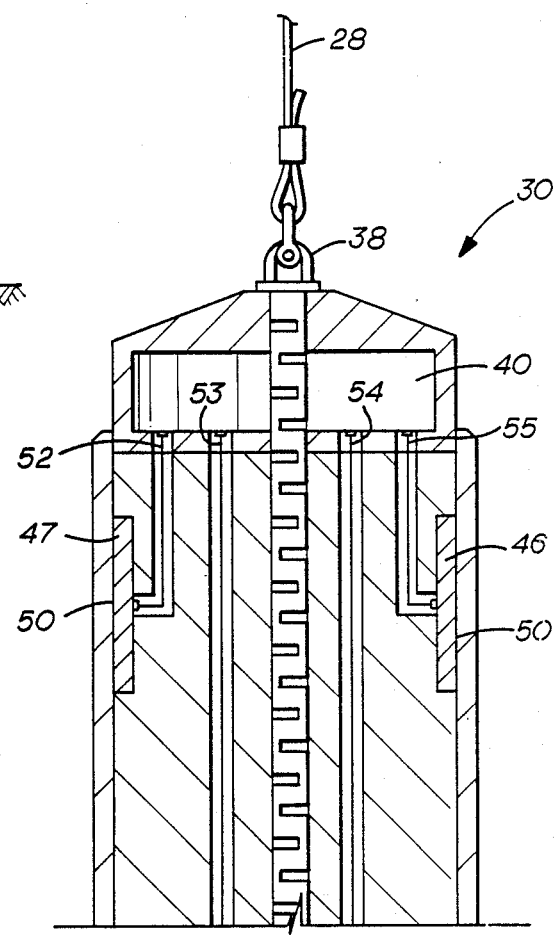
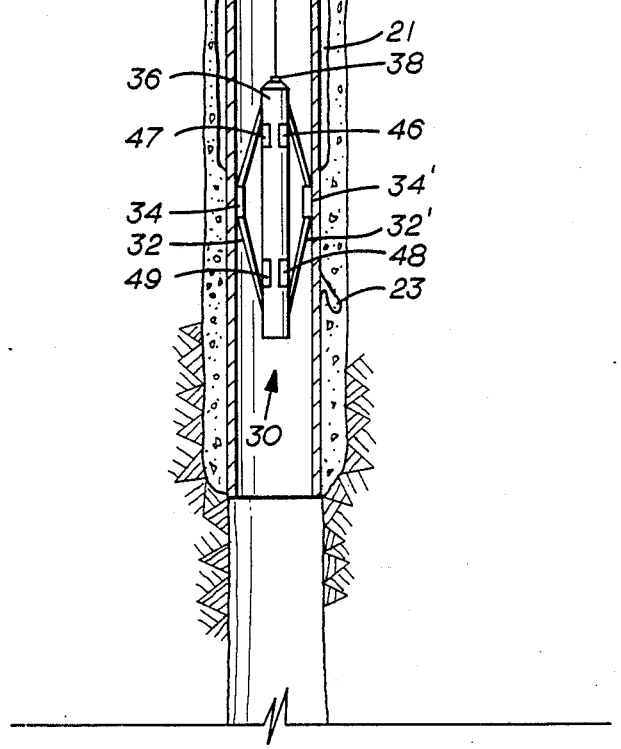
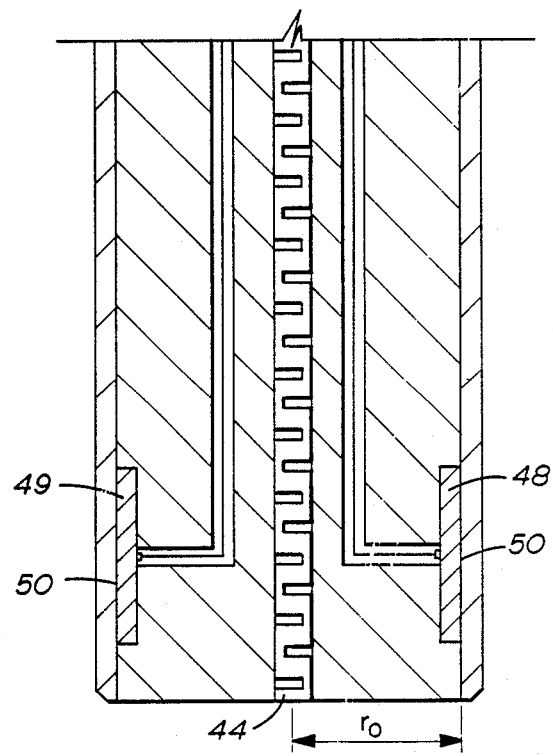
FIG. 1A
FIG. 1B

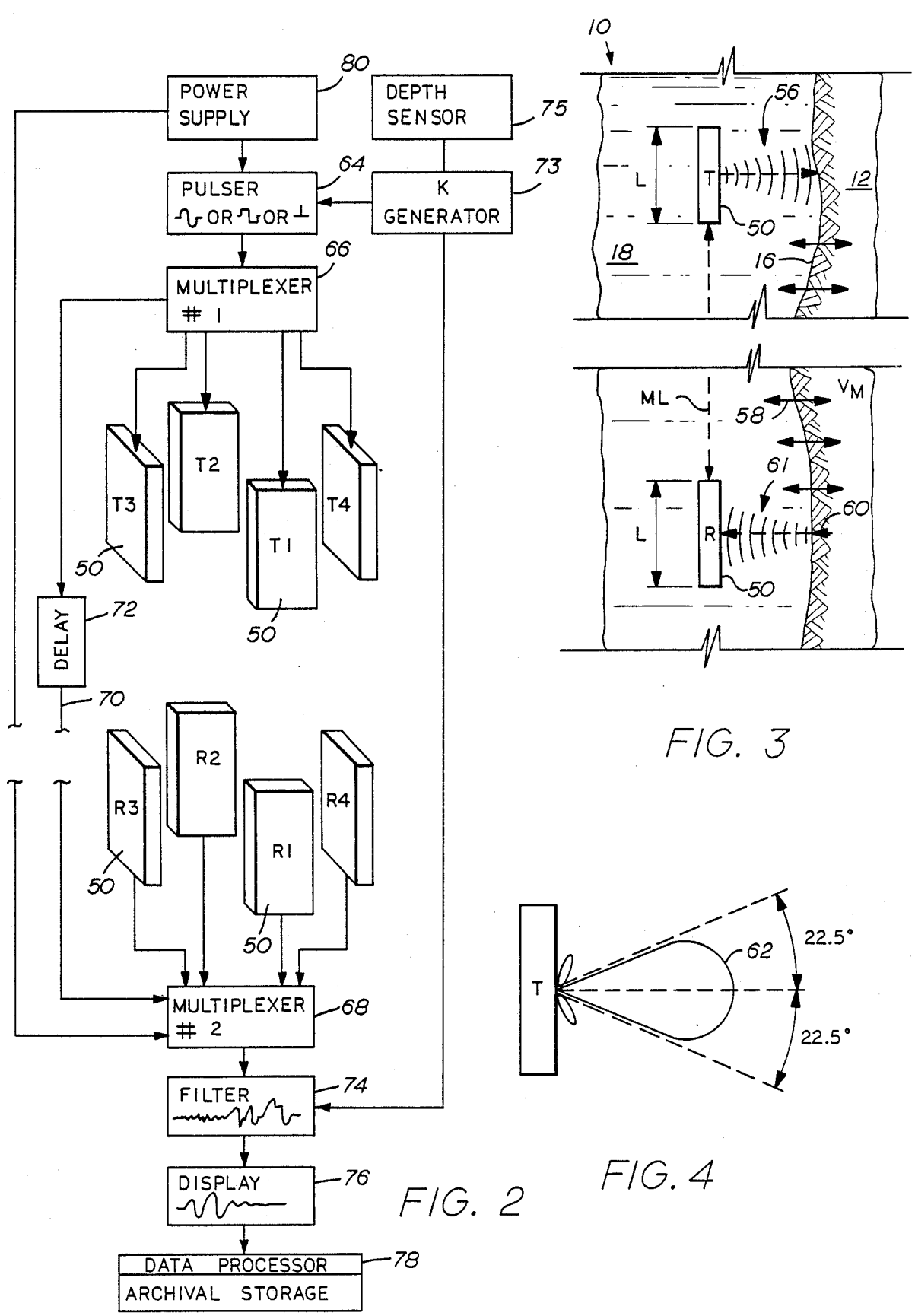

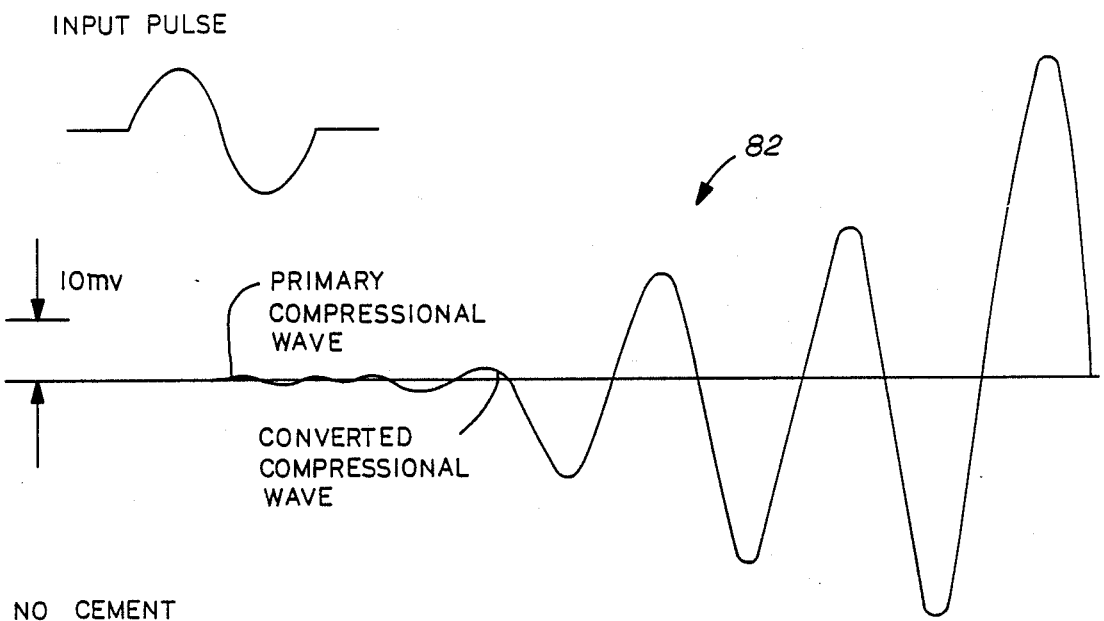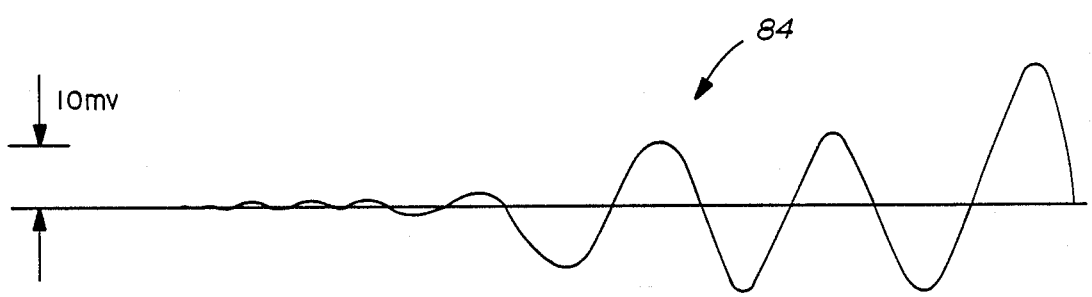
FIG. 8

4,834,209

TRANSVERSE WAVE LOGGER

BACKGROUND OF THE INVENTION

1. Relation to Other Disclosures

This disclosure is related to U.S. patent application No. 103,459, now U.S. Pat. No. 4,809,237, entitled Method for Monitoring the Goodness of the Cement Bond to a Borehole Casing, which is filed concurrently with this application.

2. Field of the Invention

This invention relates to acoustic borehole logging tools for use in investigating the properties of the borehole sidewall material, such as the goodness of the cement bond to the borehole casing. Such tools may be found in class 367.

3. Discussion of the Prior Art

Acoustic logging tools for measuring properties of the sidewall material of a borehole are well known. Basically, such tools measure the travel time of an acoustic pulse over a known distance through the sidewall material. From those data, the acoustic-wave propagation velocity is calculated. For some applications, the character of the seismic or acoustic waveform is also of interest. Criteria of interest are amplitude and frequency.

Acoustic waves propagate through elastic media in various modes. Of interest are compressional or P-waves, wherein particle motion is in the direction of wave travel, and transverse or S-waves wherein particle motion is perpendicular to the direction of wave travel. Other types of waves propagate in the borehole such as pseudo-Raleigh wave, Stonley wave, tube waves, and compressional waves directly through the mud column. Those other waves are interesting but often are more of a nuisance than otherwise.

S-waves are distinguished from P-waves chiefly by their velocity. The P-wave velocity is determined by the elastic constants and the density of the medium through which the P-waves propagate. The S-wave velocity is less than the P-wave velocity in the ratio $$V_p/V_s = \sqrt{(1 - \sigma)(1/2 - \sigma)}$$

where $\sigma$ is Poisson's ratio which is about 0.25 for idealized elastic solids. The S-wave velocity is therefore 0.5773 $V_p$ or, for practical purposes, about half of the P-wave velocity. In fluid, $\sigma = 0.5$ and $V_p/V_s = \infty$. Hence, S-waves cannot propagate through a fluid.

When a compressional or P-wave is generated in the borehole fluid, it may be refracted at the Snell's-law critical angle into the formation at the interface between the borehole fluid and the formation. At that point, both P-waves and S-waves are generated which propagate through the formation. The P-wave may be refracted back into the fluid at or beyond the so-called critical distance where it may be detected as a primary compressional wave. However, the S-wave cannot escape from the formation because the borehole fluid will not support S-wave propagation. What does happen, however, is that the S-waves propagate through the sidewall material, mechanically exciting corresponding compressional waves in the fluid, giving rise to converted-compressional waves. The arrival time and the envelope of the converted compressional waves are said to be representative of certain S-wave characteristics.

For critical-angle refraction to occur, the sidewall material must be characterized by a propagation velocity that is greater than that of the borehole fluid. In soft or sloughing formations, the S-wave propagtion velocity may be less than that of the fluid. S-waves from critical-angle refraction, therefore, are not present. It has been found that in such circumstances, S-waves can be generated by applying a normally-incident compressional pulse, sideways, directly against the sidewall material. The effect, termed direct excitation, may be likened to application of a hammer-blow to the sidewall.

Direct excitation, as taught herein, should be distinguishd from so-called point-force excitation. In the former case, the transducer dimensions are comparable to the wavelength of the acoustic radiation. In the case of point-force excitation, the transducer dimensions are negligible as compared with the wavelength of the radiated acoustic waves, perhaps more than one order of magnitude less than that wavelength.

In bore-hole logging, data provided by both P-waves and S-waves are of interest for diagnostic studies. Information so derived permits the determination of formation elastic constants, rock texture, rock fluid content, formation fracturing and the goodness of cement bonding to the borehole casing. For some studies, however, it has been found that S-wave information is superior to P-wave information.

S-waves may be directly detected by suitable sensors that are mounted on pads that are pressed into direct contact with the borehole sidewall such as taught by U.S. Pat. No. 3,376,950. The disadvantage of such tools is that the sensors and the pads are severely abraded as the tool is moved along the borehole. Further, that motion generates a good bit of "road noise". Direct-contacting tools have not been found to be very satisfactory.

A number of logging tools have been proposed wherein the tool is suspended directly in the borehole fluid but carefully separated from physical contact with the borehole wall, usually by centralizers or bumpers. Those disclosures purport to detect transverse or S-waves. For reasons explained earlier, those tools detect converted-compressional waves, but not, strictly speaking, transverse waves.

Typical prior-art tools are exemplified by Caldwell, U.S. Pat. No. 3,333,238, wherein he employs symmetrical cylindrical transducers to generate and presumably receive transverse waves. He is interested in the S-wave amplitude. To avoid interference with other acoustic arrivals, he provides electronic delay-gating to preferentially receive the desired signals.

White, U.S. Pat. No. 3,330,375, teaches a wavelength tuning technique to identify the various waveforms on the basis of propagation velocity. He employs an array of receivers to provide a spatial interference filter that discriminates in favor of selected wavelengths.

Pickett, et al, in U.S. Pat. No. 3,276,533, employs a piezoelectric receiver and several magnetostrictive transmitters to selectively record slow acoustic arrivals that have traveled over various distances separating the receiver and transmitter. He is interested in providing character logs. Asymmetrical insonification is employed.

Ingram, U.S. Pat. No. 4,131,875, seeks preferentially to enhance later acoustic-wave arrivals relative to the early arrivals, the wavelengths of the later arrivals being much greater than the borehole diameter. The early and late arrivals are frequency-separable. A symmetrical transducer array consisting of a transmitter and several receivers is taught.

Zamanek, U.S. Pat. No. 4,516,228, teaches a logging tool for detecting both P-waves and S-waves. A symmetrical transmitter applies point-force pulses to the sidewall material. A dual-crystal piezoelectric receiver is provided. Electronic circuitry provides gating pulses wherein the signals of the dual-crystal receiver are subtracted such that the difference signal is representative of P-wave arrivals. After a suitable gated delay, the receiver operates in the asymmetrical mode to add the signals received by the crystal receiver to produce a sum signal representative of S-waves.

As mentioned above, for certain diagnostic measurements, use of S-waves is preferable to use of P-waves. For example, in cement-bond studies, it is known that for no cement bond or for a poor cement bond between formation and borehole casing, a strong compressional wave travels through the steel casing at a casing velocity of 17,000 feet per second (fps). If a good bond exists, the casing wave is strongly attenuated and the compressional formation-wave appears having a velocity on the order of 8–12,000 fps.

We have found that P-wave analysis of cement bonding is over-sensitive to the presence of a micro-annulus around the casing but is insensitive to the presence of small vertical channeling. A micro-annulus is defined as a slight separation between cement and casing of a few thousandths of an inch, say less than 0.015 inch. A micro-annulus is not considered to be a problem in respect to well completion insofar as cement-to-casing bonding is concerned. Yet the results of a P-wave study might indicate no cement bond at all, as indicated by a strong casing wave arrival, with the possible recommendation of an expensive and unnecessary cement squeeze job. We have discovered that transverse or S-wave studies are not significantly sensitive to the presence of a micro-annulus.

Another problem with P-wave studies arises when the logging tool is not exactly centered in the borehole. A deviation of as little as 1/16 of an inch has been found to produce unreliable test results. That problem is particularly true when using symmetrically-radiated acoustic energy as for cylindrical transducers. We have found that use of converted-compressional waves in conjunction with asymmetrically-configured sensors is substantially insensitive to so-called ex-centering.

Thus, we have discovered that the compressional-wave amplitude through the casing does not change very much even in the presence of significant channeling or micro-annuli. On the other hand, the relative converted-compressional wave amplitude will vary significantly in response to the goodness of the cement-to-casing bond, ignoring, however, micro-annuli, the amplitude being larger where the cement bond is poorer. Further, any variation of the relative converted-compressional wave amplitude is between transducer sets at different azimuths will indicate channeling or some other anomaly.

SUMMARY OF THE INVENTION

It is an object of this invention to provide a transverse-wave logging tool for use in well-bore fracture detection, cement-bond diagnosis, rock elastic parameters and other studies.

In accordance with this invention, there is provided an acoustically-insensitive mandrel having a longitudinal axis. The mandrel is adapted to traverse the length of a borehole at different depths therein, parallel to the sidewall thereof. A set of two transducers, including a transmitter and a receiver, is mounted on the mandrel. The transducers each have an active face that is exposed through an acoustically-transparent window to the sidewall material of the borehole. The active faces are characterized by two orthogonal dimensions such as vertical height and horizontal width.

Means, such as an oscillator or pulser, is provided to excite the transmitter at a sonic frequency, f, given by $$f = KV_m/2L,$$

where K is a constant of proportionality that may be depth dependent, $V_m$ is the largest transverse-wave propagation velocity of the sidewall material adjacent to the transducers, and L is equal to one of the two orthogonal dimensions such as the vertical height of the transducers. The transducers are spaced-apart on the mandrel by a multiple, M, of L, where $M > 2$. The transducers are thus self-resonant at frequency f.

In accordance with another aspect of this invention, the transducers of the set are mounted on the mandrel, one above the other, parallel to the longitudinal axis of the mandrel.

In accordance with another aspect of this invention, the transducers of a set are mounted side-by-side, perpendicular to the longitudinal axis of the mandrel.

In accordance with yet another aspect of this invention, a plurality of transducer sets are mounted on the mandrel.

In accordance with a further aspect of this invention, the receiver transducer receives converted-compressional waves. Filtering and processing means are provided to enhance the resonant-frequency content, f, of the received converted-compressional-wave signals.

In accordance with another aspect of this invention, the radius of curvature or of the transducers is established in accordance with the inequality:

$$r_0 \leq r \leq \infty,$$

where $r_0$ is the radius of the curvature of the mandrel.

BRIEF DESCRIPTION OF THE DRAWINGS

The benefits and features of this invention will best be understood by reference to the appended detailed description and the drawings, wherein:

FIG. 1a is a cross sectional view of an ultrasonic logging tool suspended in a borehole;

FIG. 1b is a detailed cross section of logging tool 30;

FIG. 2 is a schematic diagram of one configuration of the logging-tool transducers and electronics;

FIG. 3 is an explanation of the mechanism for generating converted-compressional waves;

FIG. 4 shows the radiation pattern of a transducer having the preferred dimension;

FIG. 8 illustrates typical wave trains obtained with and without a cement bond around a borehole casing.

DETAILED DESCRIPTION OF THE PREFERRED EMBODIMENT

Figure 5:
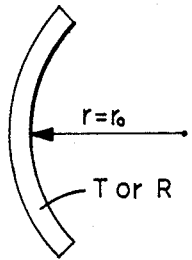
FIGS. 5 and 6 show alternate shapes of the transducer elements.

Referring to FIGS. 1a and 1b, there is shown a borehole 10 such as an oil or gas well that is drilled into the formation 12 beneath the surface 14. The borehole has a sidewall 16 and is generally filled with a drilling fluid 18 such as a specially-prepared mud. A drill rig 20 having a draw-works 22 is mounted over the hole 10. A sheave 24, suspended from crown block 26, supports a logging cable 28 that is attached to draw-works 22. On the end of cable 28 there is suspended an acoustic logging tool generally shown as 30. Logging tool 30 is adapted to continuously traverse the length of the borehole at different depths therein, parallel to the sidewall 16 thereof, by operation of draw-works 22. Borehole 10 may be cased with a steel casing 17, and bonded to the formation 12 by cement 19, or it may be uncased. A microannulus is shown at 21 and a small channel at 23.

In this disclosure, it is assumed that the borehole is drilled substantially vertically, although it is known that such holes sometimes deviate significantly from the gravitational vertical. Hereinafter, the terms "vertical" and "horizontal" are used for convenience to refer to the positioning of elements on the logging tool, parallel or perpendicular, respectively, to the longitudinal axis of the tool.

Logging tool 30 may be centered in borehole 10 by centralizer springs 32, 32' and stand off pads 34, 34'. The stand off distance D will be discussed later.

Logging tool 30 includes a mandrel 36 having a suspension clevis 38 for attachment to cable 28. Mandrel 36 is preferably cylindrical but may be any other convenient shape. Mandrel 36 has a radius of curvature $r_o$ commensurate with the diameter of a borehole to be logged. The upper portion of mandrel 36 may include a chamber for an electronics package 40 to be described in connection with FIG. 2. The mandrel 36 consists of a Teflon ® (Dupont trademark) cylinder 42 with a low-velocity central stress member 44 which may be slotted as shown.

Mounted on the mandrel, there is a first set of two electro-acoustic transducers 46 and 48, one of which may be an electro-acoustic transmitter transducer, the other of which being an electro-acoustic receiver transducer. A second set of two transducers 47 and 49 is mounted on the other side of mandrel 36. Additional sets of transducers may be mounted around the perimeter of mandrel 36 as desired. As shown, the transducers are spaced apart vertically, one above the other, in a plane that is parallel to the longitudinal axis of the logging tool. Other configurations are possible as will be shown in FIG. 7. The transducers each have an active face, such as 50, that is exposed to the borehole sidewall 16 through an acoustically-transparent medium such as a neoprene boot 51, that is held in place by any convenient means. Boot 51 also serves to hold the transducers in position. The electrical-signal inputs to, and electrical outputs from the transducers are transmitted over wirelines 52, 53, 54 and 55 to electronics package 40 through suitable conduits in mandrel 36. The transducers may consist of conventional piezoelectric ceramic material having a metallic electrode coating on each face. For simplicity, only a single lead is shown to each transducer although two such leads are used in practice. Preferably the transducers may be of the thickness-expander type.

FIG. 2 is a schematic view of a group of four sets of transducers that may be mounted on a mandrel (not shown in FIG. 2 for clarity) along a plane parallel to the longitudinal axis of the mandrel. The transducer sets include $T_1R_1$, $T_2R_2$, $T_3R_3$ and $T_4R_4$. Each transducer face has two orthogonal dimensions, one of which is equal to one-half the wavelength of a transverse or S-wave propagating through the borehole sidewall. The exact size L, of that one dimension is necessarily chosen to be commensurate with the physical size of the logging tool, the S-wave formation velocity, the borehole diameter and the optimum distance over which transverse waves can be received without undue contamination by unwanted acoustic waves.

We have found from laboratory tests that, for the vertical configuration of FIG. 2, a satisfactory separation is about nine inches between the adjacent edges of a set of transducers. We have further discovered that the nine-inch separation should be a multiple, M, where $M > 2$, of the dimension L, where the dimension L is measured in-line between the transducers of a set. Thus L should be about 1.5 inches for the vertical configuration of FIG. 2, where M=6. Given the initial design parameters therefore, for L to be a half-wavelength, the transmitted excitation energy must include a frequency component, f, that will be proportional to the highest S-wave velocity $V_m$, expected to be encountered in the borehole:

$$f = KV_m/2L.$$

K is a constant of proportionality which may be unity if the S-wave velocity is the same throughout the borehole. That would be true for a cased hole where the P-wave velocity in the casing would be about 17,000 fps. Based on the above assumptions, the S-wave velocity for a cased hole would be about 8500 fps so that the excitation frequency would be about 34 kHz for a transducer length L, of 1.5 inches and a spacing, ML, of 9 inches. The electro-acoustic transducers become resonant at that frequency.

For an open uncased hole, it would be possible to use a fictitious casing velocity as an initial estimate and then to modify K in accordance with an estimate of the S-wave velocity as derived from a-priori experience in the area. Alternatively, a P-wave velocity logger could be combined with the logging tool of this invention. The required S-wave velocity, $V_m$ could then be derived from the P-wave velocity on a continuous basis as a function of depth to generate the appropriate excitation-frequency drive signal to the transmitter.

In FIG. 3, we show the mechanism by which we receive converted-compressional waves representative of S-waves propagating through the borehole sidewall 16 drilled through formation 12. Transducer T emits a signal or pulse which propagates through the borehole fluid as a compressional pulse represented by the wavefronts 56. When the compressional pulse 56 directly excites the interface between sidewall 16 and fluid 18 at normal incidence (that is, substantially at a right angle to sidewall 16) transverse waves are set up as shown by the double-headed arrows such as 58. The transverse waves ripple along the formation/fluid interface and according to Huyghen's principle, generate converted-compressional waves in the fluid at every point along the way, including point 60, opposite transducer R. The converted-compressional waves impinge upon R, along the normal as shown by wavefronts 61, to generate a signal therein. In FIG. 3, dimension L is defined. The transducers are separated from each other by multiple M of dimension L where M>2 and preferably equals 6. The stand-off distance D (FIG. 1) is preferably substantially equal to or less than L.

Referring to FIG. 4, we have found that by setting L equal to one-half the wavelength of the excitation frequency, we maintain good directivity of the principal lobe 62 of the radiated acoustic energy. The width of the main lobe is ±22.5° relative to the normal.

Figure 6:
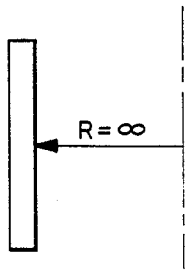

The shape of the transducer elements, as seen in plan view, that is looking down from the top of mandrel 36, may be arcuate as in FIG. 5 or planar as in FIG. 6. If arcuate, the minimal radius of curvature would be that of a cylindrical mandrel whose radius of curvature is $r_o$ as shown in FIG. 1b. In the case of a planar shape, of course, the radius of curvature, is by definition, infinite. The radius of curvature may be defined therefore by the inequality $$r_o \leq r \leq \infty$$

From laboratory tests, we have found that it is preferable to use transducers having a planar shape, that is flat.

Although other outlines may be used, we prefer to use transducers having a rectangular outline as shown in FIG. 2.

Returning now to FIG. 2, in our presently preferred mode of operation, the logging tool is moved along the well bore to desired depths. At intervals of about ten milliseconds, pulser 64 radiates a pulse containing energy having a frequency component, f. The pulse may be a single-cycle sinusoidal wave, a square wave or a Dirac spike. First multiplexer 66 directs a pulse to each transmitter transducer $T_1$ through $T_4$ in sequence. A second multiplexer 68 is synchronized with multiplexer 66 through line 70 and delay circuit 72 to sequentially activate receiver transducers $R_1$ through $R_4$ to receive signals from the corresponding transducers. The delay time of delay circuit 72 may be chosen to gate out faster-arriving P-waves or other interference thus favoring the slower-propagating converted-compressional waves. The response of filter 74 is shaped to enhance signals in the acoustic spectral region of the received signal-frequency component, f, of the converted-compressional waves resulting from transverse-wave signal propagation thereby to discriminate between converted-compressional waves and primary compressional-wave arrivals.

Pulser 64 may be an oscillator whose output frequency may be controlled as a function of the magnitude of the constant of proportionality K, by K-generator 73. The magnitude of K may be adjusted as a function of depth by depth sensor 75 such as a revolution counter associated with draw-works 22. K-generator 73 also serves to modulate the frequency-response characteristics of filter 74. Components 64, 73, 74 and 75 may be analog or preferably digital such as a properly programmed microprocessor of any type well known to the art. The specific design forms no part of this invention.

The filtered signal may be displayed on a display device 76 and/or sent to a data processor for quantitative analysis such as relative amplitude comparison and for archival storage in device 78. All of the electronics devices are of course powered by power supply 80. The electronics package hereinbefore described may be mounted in the logging tool itself as shown in FIG. 1 as electronics package 40, or it may be located at the surface. The actual disposition of the electronics forms no part of this invention.

Figure 7:
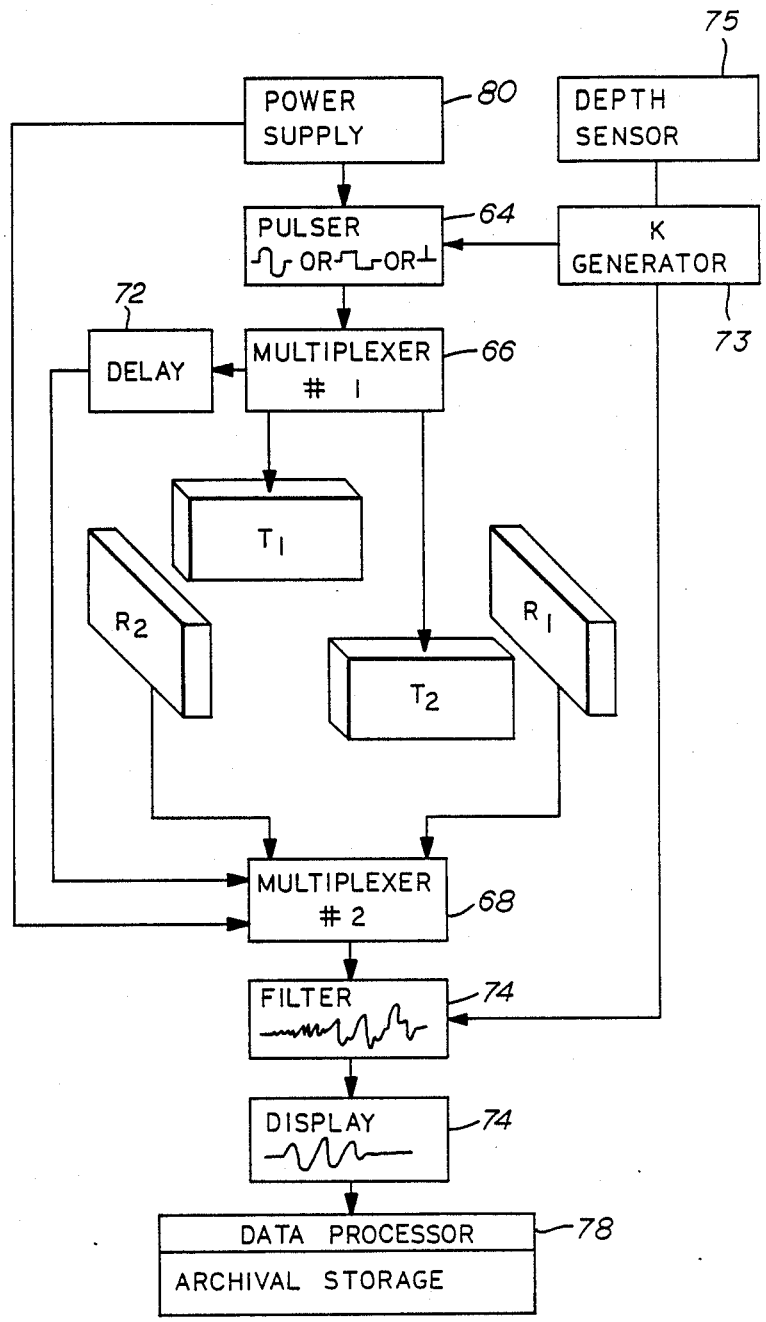
FIG. 7 shows an alternate configuration for the transducers.

FIG. 7 illustrates an alternate configuration of the logging tool wherein the sets of electro-acoustic transducers are disposed horizontally in a plane perpendicular to the longitudinal axis of the mandrel. The electronics package operates in the same manner as for FIG. 2. Dimension L, however, is measured in a horizontal direction rather than in the vertical direction as in previous figures. Because the diameter of the logging tool is limited, the dimension L, is necessarily much less than for the vertical configuration. The excitation frequency will therefore approach an order of magnitude higher than was calculated in the earlier numerical example.

In FIG. 8 we demonstrate laboratory-derived converted-compressional wave trains 82 and 84, for casing with and without cement bonding, using a tool made according to the teachings of this disclosure. The transmitter transducer was triggered with a pulse having a period corresponding to about 33 kHz. Both P-waves and converted compressional waves were detected by the receiver transducers. The excitation resulted in an undamped wave train having a period of about 30 microseconds. It is to be observed that the P-wave amplitude is virtually the same for both wave trains 82 and 84. However, in the presence of a cement bond, for wave train 84, the converted compressional wave amplitude was significantly reduced by about 6 dB.

Those skilled in the art will recognize that variations in the type of transducers or electronics may be made without departing from the scope and spirit of this invention, which is limited only by the appended claims. For example, piezoelectric transducers are preferred but magnetostrictive devices could be substituted. By way of example, the transmitter transducers are shown mounted above the receiver transducers in FIGS. 1 and 2. Their position could be reversed if desired. The electronics package may be either analog or digital at the option of the user.

We claim as our invention:

1. A transverse-wave acoustical logging tool for investigating properties of the sidewall material in an elongated borehole, comprising:
   an acoustically-insensitive cylindrical mandrel, adapted to traverse the length of a borehole at different depths therein, parallel to the sidewall thereof;
   an electro-acoustic signal-transmitter element and an electro-acoustic signal-receiver element, each having preselected vertical and horizontal dimensions, disposed one above the other on said mandrel, the elements being vertically spaced apart by a multiple, M, of the vertical dimension, L, of said transmitter element where M>2, the vertical dimension of each said element being substantially one-half the wavelength of a transverse wave propagating in the sidewall material of said borehole at velocity $V_m$;
   means for exciting said transmitter element, and means for processing acoustic signals detected by said receiver element; and
   means for enhancing a received acoustic signal frequency component, f, as given by $f = KV_m/2L$.

2. The logging tool as defined by claim 1, comprising means for exciting said transmitter element with energy including an acoustic frequency component, f.

3. The logging tool as defined by claim 1, wherein the horizontal shape of each said electro-acoustical element is curved to a preselected radius of curvature, r, in accordance with the inequality $$r_0 \leq r \leq \infty,$$

where $r_0$ is the radius of curvature of the cylindrical mandrel.

4. The logging tool as defined by claim 2, comprising filter means, electrically interconnected with said electro-acoustic receiver element, said filter means having a peak response in the acoustic spectral region of said frequency component, f; and
means for processing the filtered output signal of said receiver element.

5. The logging tool as defined by claim 4, comprising a plurality of vertically spaced-apart electro-acoustic transmitter and receiver elements peripherally disposed about the circumference of said cylindrical mandrel.

6. The logging tool as defined in claim 5, comprising:
first multiplexer means for sequentially exciting each one of said plurality of transmitter elements; and
second multiplexer means synchronized with said first multiplexer means, interconnected between each of said plurality of receiver elements and said filter and data processor means, for sequentially processing the respective receiver-element output signals.

7. The logging tool as defined by claim 6, comprising means for quantitatively comparing the characteristics of the filtered output signals from the respective peripherally-disposed electro-acoustic receiver elements.

8. The logging tool as defined by claim 4, wherein the response of said filter is shaped to enhance signal characteristics resulting from a converted-compressional wave propagation mode and to suppress signals resulting from a primary compressional-wave propagation mode.

9. The logging tool as defined by claim 1, comprising means for exciting said electro-acoustic transmitter element at a frequency proportional to the depth-dependent shear-wave velocity characteristic of the borehole sidewall material adjacent said transmitter element.

10. The logging tool as defined by claim 3, wherein said electro-acoustic transmitter and receiver elements have piezoelectric properties.

11. The logging tool as defined by claim 2, comprising means for modifying K, a constant of proportionality, as a function of depth.

* * * * *